United States Patent
Anastasakos et al.

(10) Patent No.: US 7,197,331 B2
(45) Date of Patent: Mar. 27, 2007

(54) METHOD AND APPARATUS FOR SELECTIVE DISTRIBUTED SPEECH RECOGNITION

(75) Inventors: Tasos Anastasakos, San Jose, CA (US); Senaka Balasuriya, Arlington Heights, IL (US); Michael Van Wie, Rochester, NY (US)

(73) Assignee: Motorola, Inc., Schaumburg, IL (US)

( * ) Notice: Subject to any disclaimer, the term of this patent is extended or adjusted under 35 U.S.C. 154(b) by 432 days.

(21) Appl. No.: 10/334,158

(22) Filed: Dec. 30, 2002

(65) Prior Publication Data
US 2004/0192384 A1 Sep. 30, 2004

(51) Int. Cl.
*H04B 1/38* (2006.01)

(52) U.S. Cl. .................. 455/557; 455/563; 455/550.1; 704/270.1; 704/231; 704/275

(58) Field of Classification Search ................ 455/557, 455/563, 550.1, 413, 511, 67.7, 79, 116; 704/270.1, 231, 275
See application file for complete search history.

(56) References Cited

U.S. PATENT DOCUMENTS

| | | | |
|---|---|---|---|
| 5,365,574 A | 11/1994 | Hunt et al. | |
| 5,956,683 A | 9/1999 | Jacobs et al. | |
| 6,006,183 A | 12/1999 | Lai et al. | |
| 6,101,472 A | 8/2000 | Giangarra et al. | |
| 6,119,087 A | 9/2000 | Kuhn et al. | |
| 6,122,613 A | 9/2000 | Baker | |
| 6,125,345 A | 9/2000 | Modi et al. | |
| 6,185,535 B1 | 2/2001 | Hedin et al. | |
| 6,269,336 B1 | 7/2001 | Ladd et al. | |
| 6,292,781 B1 | 9/2001 | Urs et al. | |
| 6,377,922 B2 | 4/2002 | Brown et al. | |
| 6,453,290 B1 | 9/2002 | Jochumson | |
| 6,487,534 B1* | 11/2002 | Thelen et al. | ................ 704/270 |
| 6,785,654 B2* | 8/2004 | Cyr et al. | ................ 704/270.1 |
| 6,834,265 B2* | 12/2004 | Balasuriya | ............... 704/270.1 |
| 6,856,957 B1* | 2/2005 | Dumoulin | .................... 704/257 |
| 2001/0021909 A1* | 9/2001 | Shimomura et al. | ........ 704/275 |
| 2001/0036255 A1 | 11/2001 | Reformato et al. | |
| 2002/0091518 A1 | 7/2002 | Baruch et al. | |
| 2003/0046074 A1* | 3/2003 | Ruback et al. | .............. 704/255 |
| 2003/0069997 A1* | 4/2003 | Bravin et al. | ............... 709/250 |

(Continued)

OTHER PUBLICATIONS

Maes, Stephane H., "Multi-modal Web IBM Position," W3C/WAP Workshop, IBM Human Language Technologies, pp. 1-9.

*Primary Examiner*—Joseph Feild
*Assistant Examiner*—Huy D Nguyen
(74) *Attorney, Agent, or Firm*—Vedder, Price, Kaufman & Kammholz, P.C.

(57) ABSTRACT

A method and apparatus for selective distributed speech recognition includes an embedded speech recognition engine (104) and a dialog manager (102), such as a browser, coupled to the embedded speech recognition engine (104). The method and apparatus further includes the dialog manager (102) being operably couple able to at least one external speech recognition engine (106), such as a WLAN speech recognition engine (108) or a network speech recognition engine (110). The method and apparatus further includes preference information (114), environment information (112) and a speech input (116) all provided to the dialog manager (102). The dialog manager (102), in response to the preference information (114) and the environment information (112), provides the speech input (116) to the embedded speech recognition engine (104), the WLAN speech recognition engine (108) or the network speech recognition engine (110).

26 Claims, 5 Drawing Sheets

U.S. PATENT DOCUMENTS

2003/0182131 A1* 9/2003 Arnold et al. .............. 704/275
2003/0195751 A1* 10/2003 Schwenke et al. ....... 704/270.1
2004/0122666 A1* 6/2004 Ahlenius .................... 704/231
2004/0128135 A1* 7/2004 Anastasakos et al. .... 704/270.1

* cited by examiner

METHOD AND APPARATUS FOR SELECTIVE DISTRIBUTED SPEECH RECOGNITION

BACKGROUND OF THE INVENTION

The invention relates generally to speech recognition, and more specifically, to distributed speech recognition between a wireless device, a communication server, and a wireless local area network.

With the growth of speech recognition capabilities, there is a corresponding increase in the number of applications and uses for speech recognition. Different types of speech recognition applications and systems have been developed, based upon the location of the speech recognition engine with respect to the user. One such example is an embedded speech recognition engine, otherwise known as a local speech recognition engine, such as SpeechToGo speech recognition engine sold by SpeechWorks International, Inc., 695 Atlantic Avenue, Boston, Mass. 02111. Another type of speech recognition engine is a network-based speech recognition engine, such as SpeechWorks 6, as sold by Speech-Works International, Inc., 695 Atlantic Avenue, Boston, Mass. 02111.

Embedded or local speech recognition engines provide the added benefit of speed in recognizing a speech input, wherein a speech input includes any type of audible or audio-based input. One of the drawbacks of embedded or local speech recognition engines is that these engines typically contain a limited vocabulary. Due to memory limitations and system processing requirements, in conjunction with power consumption limitations, embedded or local speech recognition engines are limited to providing recognition to only a fraction of the speech inputs which would be recognizable by a network-based speech recognition engine.

Network-based speech recognition engines provide the added benefit of an increased vocabulary, based on the elimination of memory and processing restrictions. Although a downside is the added latency between when a user provides a speech input and when the speech input may be recognized, and furthermore provided back to the end user for confirmation of recognition. In a typical speech recognition system, the user provides the speech input and the speech input is thereupon provided to a server across a communication path, whereupon it may then be recognized. Extra latency is incurred in not only transmitting the speech input to the network-based speech recognition engine, but also transmitting the recognized speech input, or N-best list back to the user.

Moreover, with the growth of wireless local area networks (WLAN), such as Bluetooth or IEEE802.11 family of networks, there is an increased demand in providing a user the ability to utilize the WLAN and services disposed thereon, as opposed to services which may be accessible through a standard cellular network connection. WLANs provide, among other things, the benefit of improved communication speed through the increased amount of available bandwidth for transmitting information.

One current drawback to speech recognition are limitations of recognition caused by factors, such as, an individual user's speech patterns, external noise, transmission noise, vocabulary coverage of the speech recognition system, or speech input beyond a recognition engine's capabilities. It is possible to provide a speech recognition engine which is adaptable or predisposed to a specific type of interference, such as excess noise. For example, a speech recognition engine may be preprogrammed to attempt to recognize speech input where the speech input is provided in a noisy environment, such as an airport. Thereupon, a user may provide the speech input while within an airport and if the speech input is provided to the specific speech recognition engine, the speech recognition engine may have a higher probability of correctly recognizing the specific term, based on an expected noise factor, typically background noise associated with an airport or an echoing or hollowing effect, which may be generated by the openness of terminal hallways.

Furthermore, simply because a WLAN may provide a specific service, an end user may not necessarily wish to utilize the specific service, for example, a user may have a subscription agreement with a cellular service provider and may incur further toll charges for utilizing a WLAN, therefore the user may wish to avoid excess charges and use the services already within the user's subscription agreement.

BRIEF DESCRIPTION OF THE DRAWINGS

The invention will be more readily understood with reference to the following drawings wherein.

DETAILED DESCRIPTION

Briefly, a method and apparatus for selective distributed speech recognition includes receiving a speech input, wherein the speech input is any type of audio or audible input, typically provided by an end user that is to be recognized using a speech recognition engine and typically an action is thereupon to be performed in response to the recognized speech input. The method and apparatus further includes receiving preference information, wherein the preference information includes any type of information or preference directed to how and/or where speech input may be distributed. The method and apparatus also includes receiving environment information, wherein the environment information includes information that describes the particular environment within which the speech recognition may be performed. For example, environment information may include timing information which indicates the exact time upon which the speech recognition may be selectively distributed, such as wherein a WLAN or a cellular network may provide variant pricing structures based on time of day (e.g. peak and off-peak hours).

The method and apparatus includes providing the speech input to a first speech recognition engine, such as an embedded speech recognition engine, or one of a plurality of second speech recognition engines, such as external speech recognition engines, more specifically, for example, a WLAN speech recognition engine or a network speech recognition engine. The WLAN speech recognition engine may be disposed within a WLAN and the network speech recognition engine may be disposed within or in communication with a cellular network.

The method and apparatus includes providing the speech input to the selected speech recognition engine based on the preference information and the environment information, wherein a wireless device selectively distributes speech input to one of multiple speech recognition engines based on preference information in response to environment information. A wireless device may be any device capable of receiving communication from a wireless or non-wireless device or network, a server or other communication network. The wireless device includes, but is not limited to, a cellular phone, a laptop computer, a desktop computer, a personal digital assistant (PDA), a pager, a smart phone, or any other suitable device to receive communication, as recognized by one having ordinary skill in the art.

Figure 1:
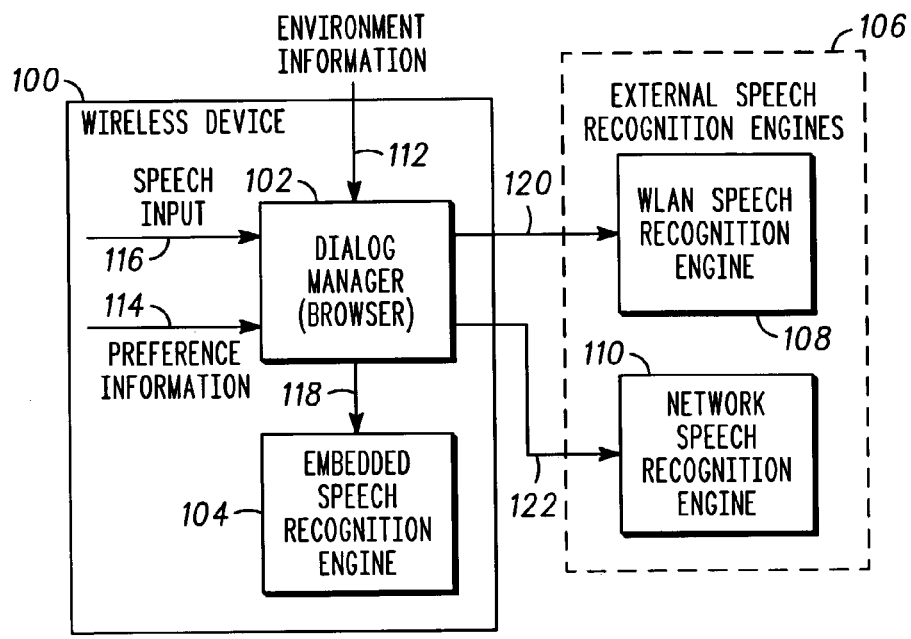
FIG. 1 illustrates one example of an apparatus for distributed speech recognition.

FIG. 1 illustrates a wireless device 100 that includes a dialog manager 102, such as a VoiceXML, SALT and XHTML or other such browser, and an embedded speech recognition engine 104. The dialog manager 102 is operably coupleable to external speech recognition engines 106, more specifically a WLAN speech recognition engine 108 and a network speech recognition engine 110. In one embodiment, the dialog manager 102 receives environment information 112, typically provided from a WLAN (not shown). The dialog manager 102 also receives preference information 114, wherein the preference information may be provided from a memory device (not shown) disposed within the wireless device 100.

The dialog manager receives a speech input 116 and thereupon provides the speech input to either the embedded speech recognition engine 104, the WLAN speech recognition engine 108 or the network speech recognition engine 110 in response to the environment information 112 and the preference information 114. As discussed below, the preference information typically includes conditions and the environment information includes factors, whereupon if specific conditions within the preference information 114 are satisfied, by a comparison with the environment information 112, a specific speech recognition engine may be selected.

If, in response to the environment information 112 and preference information 114, the embedded speech recognition engine 104 is selected for distribution of the speech input 116, the speech input is provided across communication path 118, which may be an internal connection within the wireless device 100. If the WLAN speech recognition engine 108 is selected, the dialog manager 102 provides the speech input 116 to the WLAN speech recognition engine 108 across communication path 120, which may be across a WLAN, through a WLAN access point (not shown). Furthermore, if the network speech recognition engine 110 is selected, the dialog manager 102 may provide the speech input 116 to the network speech recognition engine 110 across communication path 122, which may include across a cellular network (not shown) and further across a communication network, such as an internet, an intranet, a proprietary network, or any other suitable interconnection of servers or network computers that provide communication access to the network speech recognition engine 110.

Figure 2:
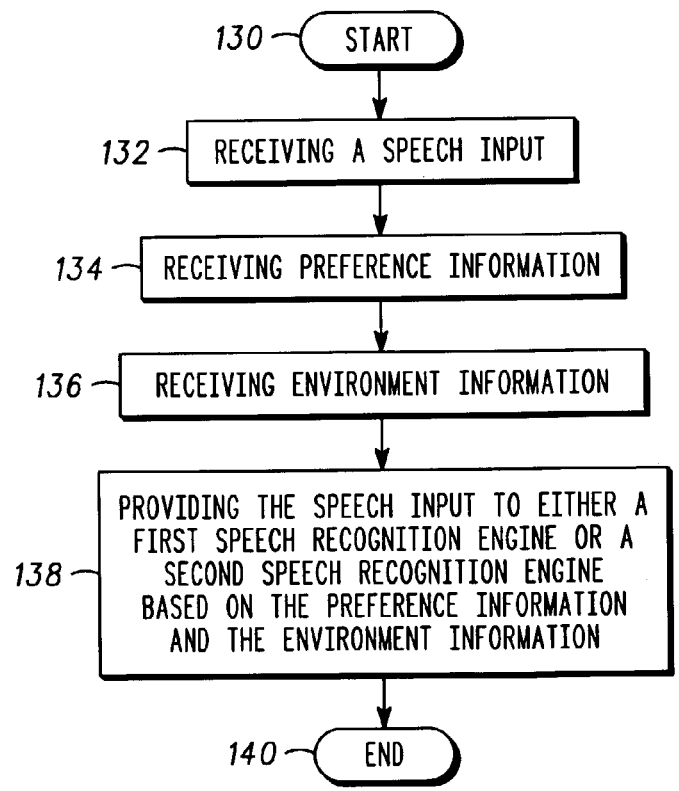
FIG. 2 illustrates one example of a method for distributed speech recognition.

FIG. 2 illustrates a flowchart representing the steps of the method for distributed speech recognition. The method begins 130 by receiving a speech input, step 132. As discussed above, the speech input is provided to the dialog manager 102, but as recognized by one having ordinary skill in the art, the wireless device may further include an audio receiver and the speech input is provided from the audio receiver to the dialog manager 102. The next step, step 134, includes receiving preference information, as discussed above with respect to FIG. 1, preference information 114 may be provided from a memory device disposed within the wireless device 100.

Thereupon, the method further includes receiving environment information, step 136. The environment information 112 may be provided from the WLAN, but in another embodiment, the environment information may also be provided from alternative sources, such as a GPS receiver (not shown) which provides location information or a cellular network which may provide timing information or toll information. The audio receiver 142 may be any typical audio receiving device, such as a microphone, and generates the speech input 116 in accordance with known audio encoding techniques such that the speech input may be recognized by a speech recognition engine. Thus, the method includes providing the speech input to either a first speech recognition engine or a second speech recognition engine based on the preference information and the environment information, step 138. As discussed above with respect to FIG. 1, the first speech recognition engine may be embedded within the wireless device 100, such as the embedded speech recognition engine 104 and the second speech recognition engine may be disposed externally, such as the WLAN speech recognition engine 108 and/or the network speech recognition engine 110. Thereupon, one embodiment of the method is complete, step 140.

In an alternative embodiment, the dialog manager 102 may provide feedback information to be stored within the memory device 150. The feedback information may be directed to reliability and quality of service based upon previous speech recognitions conducted by the WLAN speech recognition engine 108. For example, the memory device 150 may store information relating to a particular WLAN speech recognition engine, such as a manufacturing type of speech recognition engine, a specific location speech recognition engine or other variant factors which are directed to quality of service. Thereupon, this quality of service information may be included within the preference information 114 which is provided to the dialog manager 102 and utilized by the dialog manager 102 in determining to which speech recognition engine the speech input 116 is provided.

Figure 3:
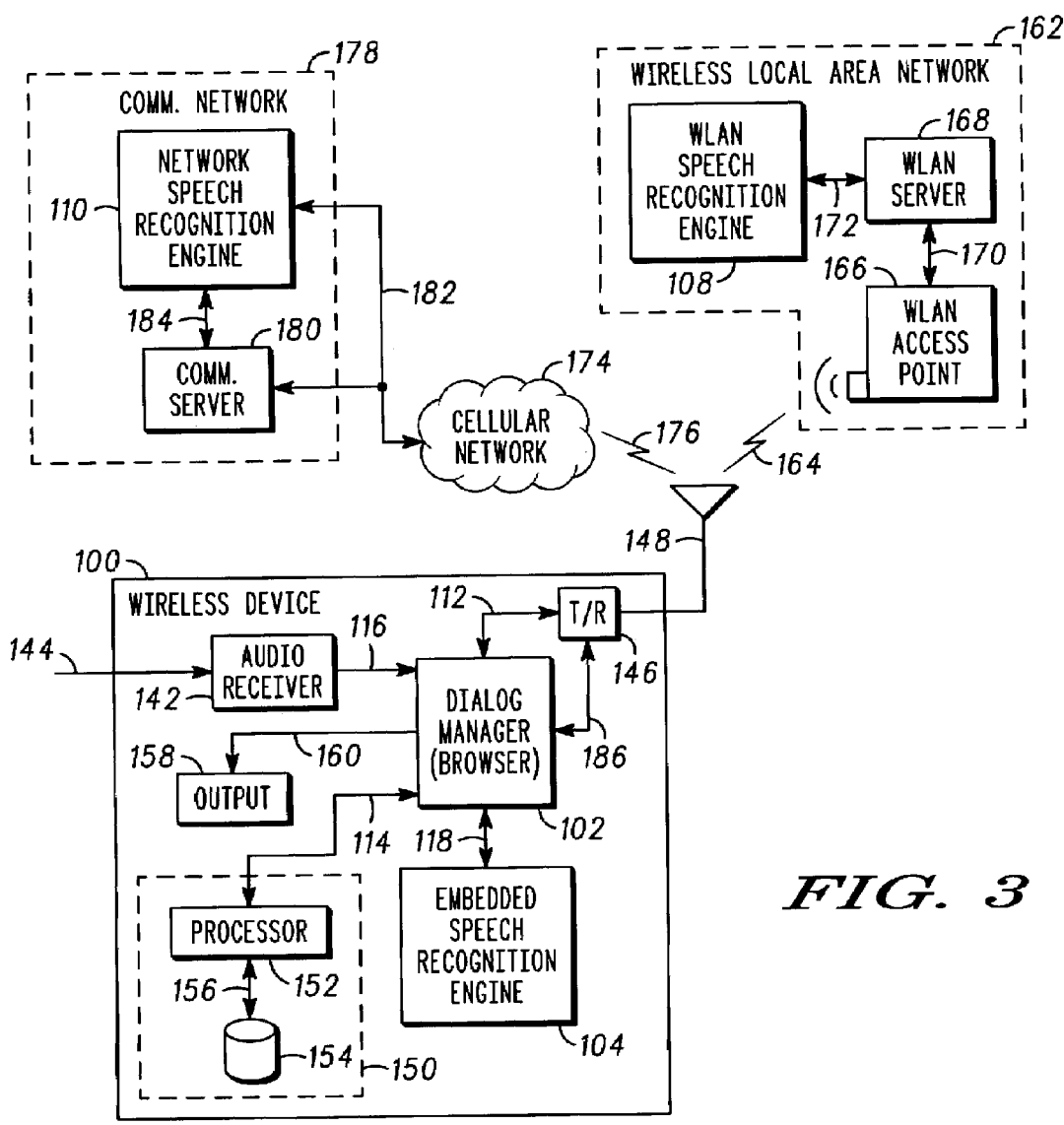
FIG. 3 illustrates another example of the apparatus for distributed speech recognition.

FIG. 3 illustrates another example of the apparatus for selective distributed speech recognition including the wireless device 100 and a dialog manager 102 and the embedded speech recognition engine 104 disposed therein. The wireless device also includes an audio receiver 142 coupled to the dialog manager 102, wherein the audio receiver 142 provides the speech input 116 to the dialog manager 102. The audio receiver 142 receives an audio input 144, typically from an end user. The dialog manager 102 is operably coupled to a transmitter/receiver 146 coupled to an antenna 148, which provides for wireless communication.

The wireless device 100 further includes a memory device 150, which in one embodiment includes a processor 152 and a memory 154, wherein the memory 154 provides executable instructions 156 to the processor 152. In another embodiment, the memory device 150 may further include any type of memory storing the preference information therein. The processor 152 may be, but not limited to, a single processor, a plurality of processors, a DSP, a microprocessor, ASIC, state machine, or any other implementation capable of processing or executing software or discrete logic or any suitable combination of hardware, software and/or firmware. The term processor should not be construed to refer exclusively to hardware capable of executing software, and may implicitly include DSP hardware, ROM for storing software, RAM, and any other volatile or non-volatile storage medium. The memory 154 may be, but not limited to, a single memory, a plurality of memory locations, shared memory, CD, DVD, ROM, RAM, EEPROM, optical storage, or any other non-volatile storage capable of storing digital data for use by the processor 152.

The wireless device 100 further includes an output device 158, wherein the output device may be a speaker for audio output, a display or monitor for video output, or any other suitable interface for providing an output, as recognized by one having ordinary skill in the art. Output device 158 receives an output signal 160 from the dialog manager 102.

The wireless device 100 may be in wireless communication with a wireless local area network 162 across communication path 164, through the transmitter/receiver 146 and the antenna 148. The WLAN 162 includes a WLAN access point 166, a WLAN server 168, wherein the WLAN access point 166 is in communication with the WLAN server 168 across communication path 170 and the WLAN server is in communication with the WLAN speech recognition engine 108 across communication path 172.

The wireless device 100 may further be in communication with a cellular network 174 across communication path 176, via the transmitter/receiver 146 and the antenna 148. The cellular network may be in communication with a communication network 178, wherein the communication network 178 may be a wireless area network, a wireless local area network, a cellular communication network, or any other suitable network for providing communication information between the wireless device 100 and a communication server 180. The cellular network 174 is in communication with the communication server 180 and the network speech recognition engine 110 via communication path 182, which may be a wired or wireless communication path. Furthermore, within the communication network 178, the communication server 180 may be in communication with the network speech recognition engine 110 via communication path 184.

Figure 4:
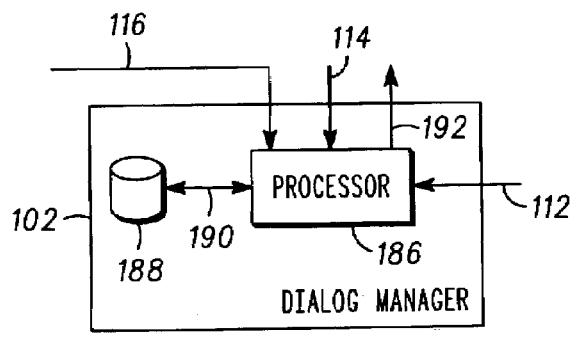
FIG. 4 illustrates an example of elements within a dialog manager.

FIG. 4 illustrates an alternative embodiment of the dialog manager 102, having a processor 186 operably coupled to a memory 188 for storing executable instructions 190 therein. The processor 186 receives the speech input 116, the preference information 114 and the environment information 112. In response thereto, the processor 186, upon executing the executable instructions 190, generates a routing signal 192 which provides for the direction of the speech input 116. In an alternative embodiment, the processor 186 may not receive the speech input 116, but rather only receive the environment information 112 and the preference information 114. In this alternative embodiment, the routing information 192 may be provided to a router (not shown) which receives the speech input 116 and routes the speech information 116 to the designated speech recognition engine, such as 104, 108 or 110.

The executable instructions 190 provide for the processor 186 to perform comparison tests of environment information 112 with preference information 114. In one embodiment, the preference information includes an if, then command and the environment information 112 provides conditions for the if statements within the preference information 114. The executable instructions 190 allow the processor 186 to conduct conditional comparisons of various factors and thereupon provide for the specific routing of the speech input 116 to a preferred, through comparison of the preference information 114 with the environment information 112, speech recognition engine.

The processor 186 may be, but not limited to, a single processor, a plurality of processors, a DSP, a microprocessor, ASIC, a state machine, or any other implementation capable of processing and executing software or discrete logic or any suitable combination of hardware, software and/or firmware. The term processor should not be construed to refer exclusively to hardware capable of executing software, and may implicitly include DSP hardware, ROM for storing software, RAM, and any other volatile or non-volatile storage medium. The memory 188 may be, but not limited to, a single memory, a plurality of memory locations, a shared memory, CD, DVD, ROM, RAM, EEPROM, optical storage, or any other non-volatile storage capable of storing digital data for use by the processor 186.

Figure 5:
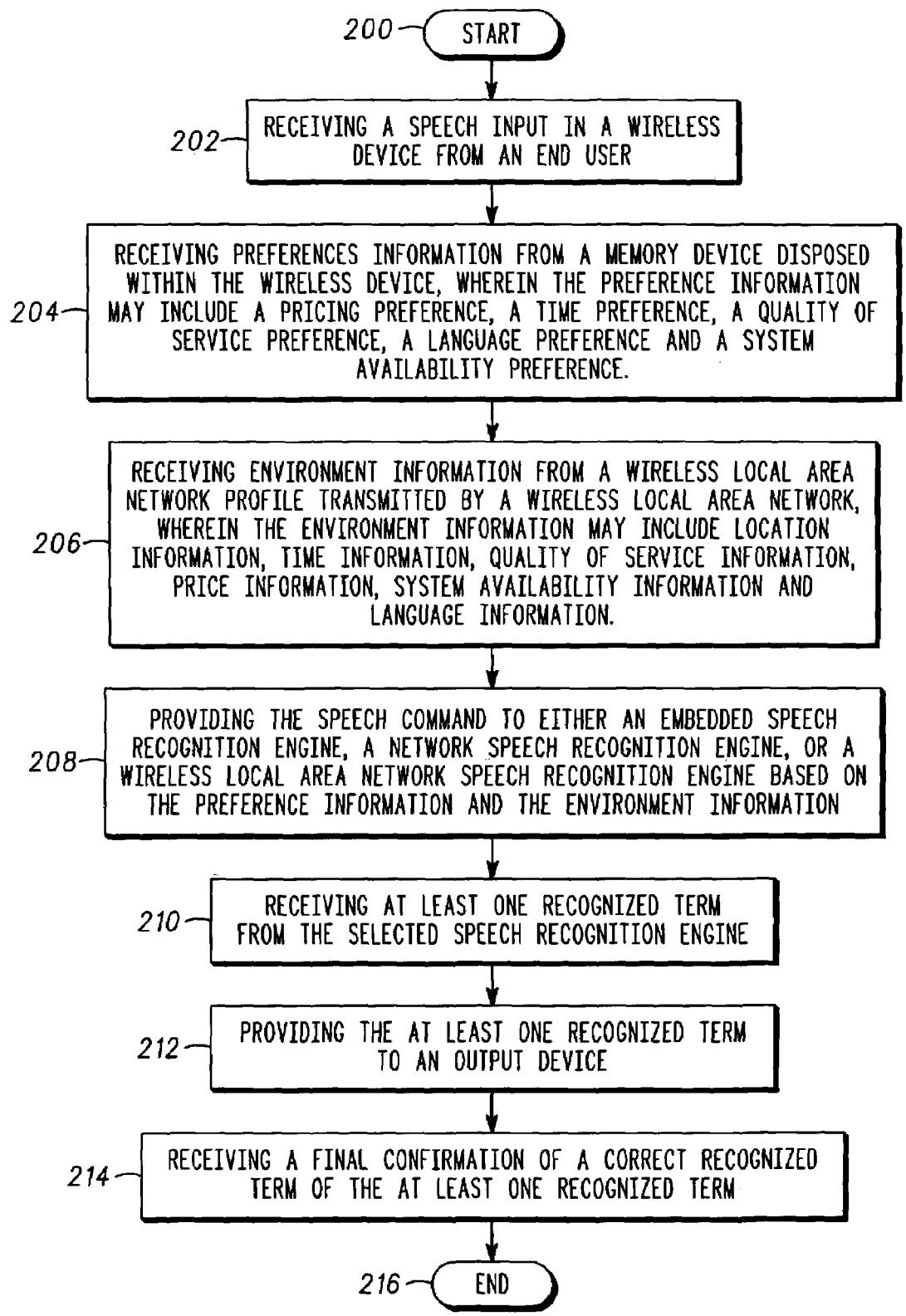
FIG. 5 illustrates another example of a method for distributed speech recognition.

FIG. 5 illustrates the steps of a flowchart of the method for selective distributed speech recognition, in accordance with the apparatus of FIG. 3. The method begins 200 by receiving a speech input in a wireless device from an end user, step 202. As illustrated, an audio input 144 is provided to the audio receiver 142 which thereupon provides the speech input 116 to the dialog manager 102, within the wireless device 100. The method includes receiving preference information from a memory device disposed within the wireless device, wherein the preference information may include a pricing preference, a time preference, a quality of service preference, a language preference and a system availability preference, step 134.

Within the wireless device 100, the memory device 150 provides the preference information 114 to the dialog manager 102. The pricing preference may be an indication that a user may prefer to avoid using a particular network or a particular speech recognition engine, based upon a specific price preference, for example, having a toll charge above a specific dollar amount. A time preference may indicate a user's preference to select a network or a speech recognition engine based upon the specific time in which the communication or speech recognition may occur, for example, a user may have a greater quantity of available minutes after a specific time, therefore a time preference may indicate preference, for example, for the cellular network 174 after peak hours and the WLAN 162 during peak hours. A quality of service preference may indicate a reliability requirement that the user or the wireless device prefers with respect to communication with or speech recognition from the cellular network or the WLAN 162. For example, the WLAN 162 may provide a reliability indicator and the dialog manager 102 may determine whether to provide communication for speech recognition based on the stated reliability of the WLAN 162 or the WLAN speech recognition engine 108. A language preference may indicate a preference that the user wishes for specific speech recognition, including, but not limited to, a regional dialect, colloquialisms, a specific language (e.g. English, French, Spanish), vocabulary coverage, ethnic speech patterns, or other linguistic aspects.

A system availability preference may provide an indication that the user or communication device has a preference for a system with a predefined level of availability, for example, a minimum amount of available bandwidth for the transmission of speech to be recognized. As recognized by one having ordinary skill in the art, preference information may include further preferences designated by the wireless device 100 for the interpretation and determination of optimizing distributed speech recognition and the above provided list is for illustration purposes only and not meant to be so limiting herein.

The next step, step 206, includes receiving environment information from a wireless local area network profile transmitted by a wireless local area network, wherein the environment information may include location information, time information, quality of service information, price information, system availability information and language information. The location information may include, but not limited to, information relating to a specific location within which the WLAN 162 may be disposed. For example, if the WLAN 162 is disposed within an airport, the environment information may provide an indication of the location being within an airport or may provide further information such as a city, state, zip code, area code or a general global positioning system location. Time information may include information such as the current time in which the WLAN profile is transmitted, restrictions and toll information based on time, such as peak and off-peak hours for communication, which may directly affect toll charges. Quality of service information may be directed to the level of quality that the WLAN 162 or the WLAN speech recognition engine 108 may be able to provide to the wireless device, such as a indication of the abilities of the WLAN speech recognition engine 108, or a reliability factor, such as an average confidence value output provided from recognized terms generated by the WLAN speech recognition engine 108. Price information may include information to the toll charges or accepted subscription agreements that may exist between different communication network 178 carriers and WLAN network 162 providers. System availability information may be directed to information related to the availability of the system at the given time of the generation of the wireless local area network profile, including bandwidth availability, or other pertinent information for determining the availability of effectively utilizing the WLAN 162 and/or the WLAN speech recognition engine 108. Language information may include information directed to the different types of language that the WLAN speech recognition engine 108 is capable of recognizing, such as specific dialects, specific languages (e.g. English, French, Spanish), vocabulary coverage, accents, or other linguistic aspects.

Thereupon, the method includes providing the speech command to either an embedded speech recognition engine, a network speech recognition engine, or a wireless local area network speech recognition engine based on the preference information and the environment information, step 208. If the dialog manager 102, in response to the comparison of specific preference information to environment information, selects the embedded speech recognition 104, the speech input 116 is provided via communication path 118. If the dialog manager 102 selects the WLAN speech recognition engine 108, the speech input is provided via the transmitter/receiver 146 through the antenna 148 across communication path 164 to the access point 166. Within the WLAN 162, the speech input is thereupon provided to the WLAN speech recognition engine 108. As recognized by one having ordinary skill in the art, the speech input may be directed directly to the WLAN speech recognition engine 108, bypassing the WLAN server 168. Furthermore, if it is determined that the WLAN speech recognition engine 108 and the embedded speech recognition engine 104 are not to be used, the dialog manager 102 may, in one embodiment, default to the network speech recognition 108 which is provided via the communication path 176 through the cellular network 174.

The next step, 210, includes receiving at least one recognized term from the selected speech recognition engine. For example, if the WLAN speech recognition engine 108 is selected, the engine 108 generates a recognized term, or in another embodiment, generates an n-best list of recognized terms, and provides the at least one recognized term back to the wireless device 100 via communication path 164, through the access point 166, across the antenna 148. The transmitter/receiver 146 may provide the at least one recognized term to the dialog manager 102, via communication 186. In one embodiment, the next step of the method for distributed speech recognition includes providing the at least one recognized term to an output device, step 212. The dialog manager 102 provides the at least one recognized term to the output device 158, wherein a user may readily ascertain the recognized term or n-best list of terms from the output device. For example, if the output device 158 is a screen, the screen may display the list of recognized terms, if there is more than one term, or the recognized term if there is only one recognized term.

A final step, step 214, includes receiving a final confirmation of the correct recognized term of the at least one recognized term provided on the output. In one embodiment, the user may provide confirmation via an audio receiver 142 or may provide it via a toggle switch or keyboard (not shown), wherein the dialog manager 102 receives the final confirmation. As such, select distributed speech recognition is generated based on the wireless device 100 comparing at least one preference information with at least one environment information provided from the WLAN 162 and a proper speech recognition is thereupon selected in response thereto, step 216.

Figure 6:
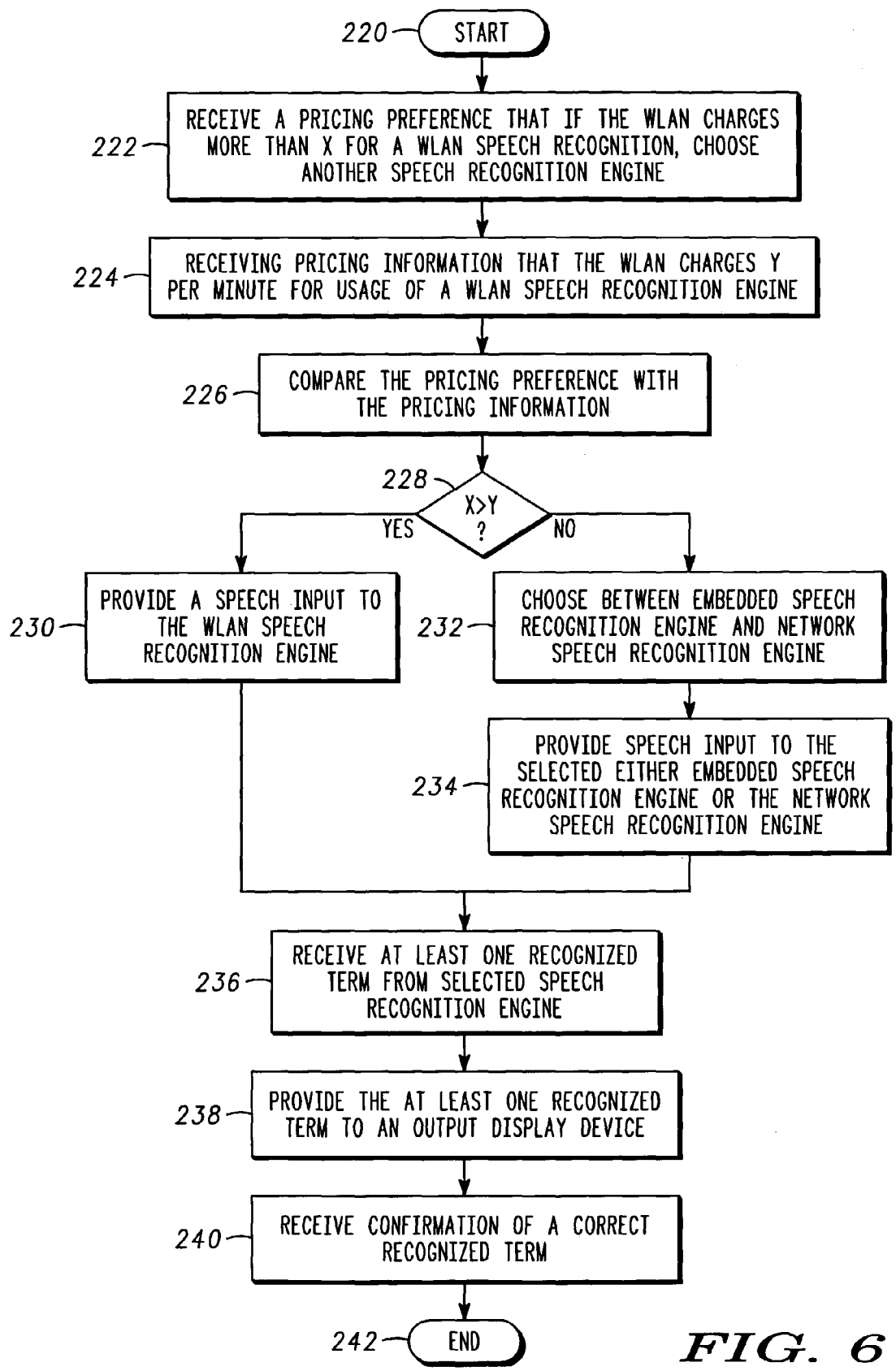
FIG. 6 illustrates an example of a method of an application utilizing selective distributed speech recognition.

FIG. 6 illustrates the steps of a method of an example of distributed speech recognition. The method begins, step 220, when the wireless device receives a pricing preference indicating that if the WLAN 162 charges more than X using the WLAN speech recognition engine 108, that the dialog manager should choose a different speech recognition engine, step 222. Next, step 224, the dialog manager 102 receives pricing information, within the environment information, a part of the WLAN profile, indicating that the WLAN 162 charges Y per minute for usage of the WLAN speech recognition engine 108.

The dialog manager 102 thereupon compares the pricing preference with the pricing information, step 226. Illustrated at decision block 228, if the charge X is greater than the charge Y, the dialog manager provides a speech input to the WLAN speech recognition engine 108, indicating that the cost for using the WLAN speech recognition engine 108 is within an acceptable price range. Also indicated at decision block 228, if X is not greater than Y, the dialog manager 102 chooses between the embedded speech recognition engine 104 and the network speech recognition engine 110. In one embodiment, the network speech recognition engine 110 may be the default speech recognition engine and only when further factors provide, the embedded speech recognition engine 104 may be utilized, such as the speech input being within the speech recognition capabilities of the embedded speech recognition engine 104. Thereupon, the dialog manager 102 provides the speech input to the selected embedded speech recognition engine 104 or the selected network speech recognition engine 110, based on the selection within step 232.

As discussed above with respect to FIG. 5, once the speech input has been recognized by a chosen speech recognition engine, the dialog manager receives at least one recognized term from the selected speech recognition engine, step 236. Thereupon, the dialog manager may provide the at least one recognized term to the output device 158, step 238. Whereupon, step 240, the dialog manager may receive confirmation of a correct recognized term. As such, the method is complete step 242.

Figure 7:
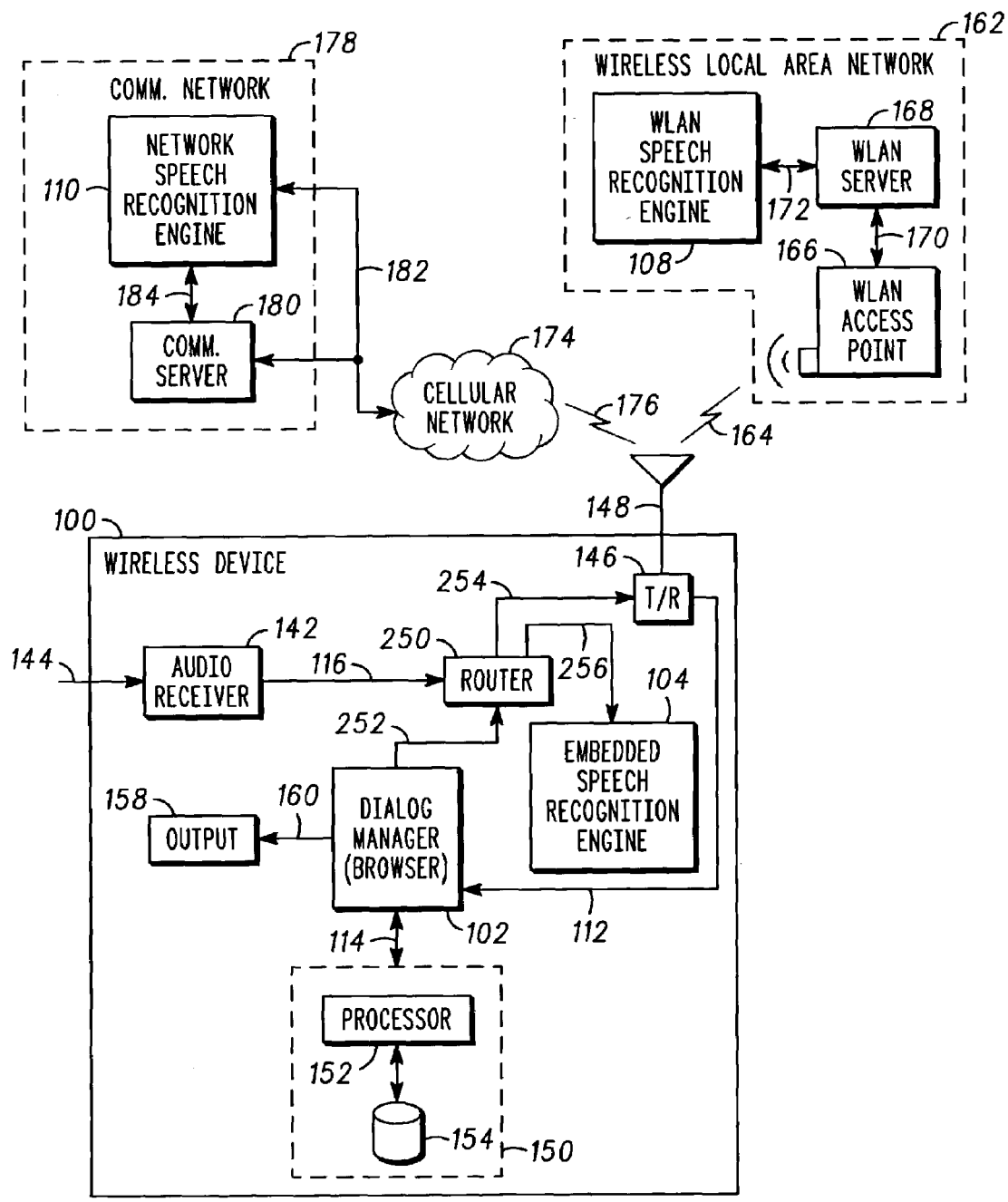
FIG. 7 illustrates another example of an apparatus for distributed speech recognition.

FIG. 7 illustrates an alternative embodiment of a wireless device 100 having a router 250 disposed within the wireless device 100 and coupled to the dialog manager 102. While this device 100 includes the embedded speech recognition engine 104, the output device 158, the memory device 150 and the audio receiver 142. In this embodiment, the dialog manager 102 receives the performance information 114 from the memory device 150 and the environments information 112 from the transmitter/receiver 146 through the antenna 148 from the WLAN 162.

The dialog manager 102, as discussed above, based on the preference information 114 and the environment information 112 generates a routing signal 252 which is provided to the router 250. The router 250, receives the speech input 116 and routes the speech input 116 to the appropriate speech recognition engine, such as 108, 110, or 104 based on the routing signal 252. If either the WLAN speech recognition engine 108 or the network speech recognition engine 110 is selected, the router provides the speech input via communication path 254 and if the embedded speech recognition engine 104 selected, the router 250 provides the speech input 116 via communication path 256. In this alternative embodiment, the dialog manager never receives the speech input 116, the speech input 116 is directly provided to the router 250 which is thereupon provided to the selected speech recognition engine.

It should be understood that there exists implementations of other variations and modifications and the invention and its various aspects, as may be readily apparent to those of ordinary skill in the art, and that the invention is not limited by the specific embodiments described herein. For example, the network speech recognition engine 110 and the WLAN speech recognition engine 108 may further be accessible across alternative networks, such as through the cellular network 174 and across intercommunication paths within the communication network 178, a speech input may be eventually provided to the WLAN speech recognition engine 108 through internal routing. The transmission of the speech input through the WLAN access point 166 may provide for higher bandwidth availability and quicker access to the WLAN speech recognition engine, but as recognized by one having ordinary skill in the art, beyond the cellular network 174, the communication network 178 may be able to be in communication with the wireless local area network 162 via other network connections, such as an internet routing connection. It is therefore contemplated and covered by the present invention, any and all modifications, variations, or equivalence that fall within the spirit and scope of the basic underlying principals disclosed and claimed herein.

What is claimed is:

1. A wireless device comprising:
   an embedded speech recognition engine;
   a dialog manager operably coupled to the embedded speech recognition engine and operably coupleable to at least one external speech recognition engine;
   preference information received by the dialog manager; and
   environment information received by the dialog manager wherein the environment information includes information that describes a particular environment within which speech recognition can be performed, and wherein the dialog manager receives a speech input and the dialog manager, in response to the preference information and the environment information, provides the speech input to at least one of: the embedded speech recognition engine and the at least one external speech recognition engine.

2. The wireless device of claim 1, wherein the environment information is provided from a wireless local area network.

3. The wireless device of claim 2, wherein the environment information is disposed within a wireless local area network profile and the environment information includes at least one of the following: location information, time information, quality of service information, price information, and system availability information.

4. The wireless device of claim 1, wherein the at least one external speech recognition engine includes a wireless local area network speech recognition engine and a network speech recognition engine.

5. The wireless device of claim 4, wherein when the speech input is provided to the wireless local area network speech recognition engine through a wireless area network access point.

6. The wireless device of claim 1 further comprising:
   a memory device operably coupled to the dialog manager, wherein memory device provides the preference information to the dialog manager, wherein the memory device is capable of receiving preference information from the dialog manager.

7. The wireless device of claim 1, wherein the preference information includes at least one of the following: a pricing preference, a time preference, a quality of service preference, a language preference and a system availability preference.

8. A method for selective distributed speech recognition comprising:
   receiving a speech input;
   receiving preference information;
   receiving environment information wherein the environment information includes information that describes a particular environment within which speech recognition can be performed; and
   providing the speech input to at least one of the following: a first speech recognition engine and at least one second speech recognition engine based on the preference information and the environment information.

9. The method of claim 8, wherein the first speech recognition engine is an embedded speech recognition engine and the at least one second speech recognition engine is at least one external speech recognition engine.

10. The method of claim 9, wherein the at least external speech recognition engine includes a wireless local area network speech recognition engine and a network speech recognition engine.

11. The method of claim 8, wherein the environment information is disposed within a wireless local area network profile and the environment information includes at least one of the following: location information, time information, quality of service information, price information, and system availability information.

12. The method of claim 11, wherein the wireless local area network profile is received from a wireless local area network.

13. The method of claim 12, wherein the preference information is received from a memory device.

14. The method of claim 8, wherein the preference information includes at least one of the following: a pricing preference, a time preference, a quality of service preference, a language preference and a system availability preference.

15. The method of claim 8 further comprising:
receiving at least one recognized term from at least one of the following: the first speech recognition engine and the at least one second speech recognition engine;
providing the at least one recognized term to an output device; and
receiving a final confirmation of a correct recognized term of the at least one recognized term.

16. An apparatus for selective distributed speech recognition comprising:
a memory storing executable instructions; and
one or more processes that, in response to executing the executable instructions:
receive preference information;
receive environment information wherein the environment information includes information that describes a particular environment within which speech recognition can be performed; and
provide a speech input to at least one of the following: an embedded speech recognition engine and at least one external speech recognition engine based on the received preference information and the received environment information.

17. The apparatus of claim 16, wherein the at least one external speech recognition engine includes a wireless local area network speech recognition engine and a network speech recognition engine.

18. The apparatus of claim 16, wherein the environment information is disposed within a wireless local area network profile and the environment information includes at least one of the following: location information, time information, quality of service information, price information, and system availability information.

19. The apparatus of claim 16, wherein the preference information includes at least one of the following: a pricing preference, a time preference, a quality of service preference, a language preference and a system availability preference.

20. An apparatus for selective distributed speech recognition comprising:
an embedded speech recognition engine;
a dialog manager operably coupled to the embedded speech recognition engine and operably couple able to at least one of the following: a wireless area network speech recognition engine and a network speech recognition engine;
a memory device operably coupled to the dialog manager;
preference information received by the dialog manager from the memory device; and
environment information received by the dialog manager from a wireless area network profile transmitted by a wireless area network wherein the environment information includes information that describes a particular environment within which speech recognition can be performed, and wherein the dialog manager receives a speech input such that the dialog manager, in response to the preference information and the environment information, provides the speech input to at least one of: the embedded speech recognition engine and the at least one external speech recognition engine.

21. The apparatus of claim 20, wherein the environment information includes at least one of the following: location information, time information, quality of service information, price information, and system availability information.

22. The apparatus of claim 20, wherein the preference information includes at least one of the following: a pricing preference, a time preference, a quality of service preference, a language preference and a system availability preference.

23. A method for selective distributed speech recognition comprising:
receiving a speech input;
receiving preference information from a memory device;
receiving environment information from a wireless area network profile wherein the environment information includes information that describes a particular environment within which speech recognition can be performed; and
providing the speech input to at least one of the following: an embedded speech recognition engine, a wireless area network speech recognition engine and a network speech recognition engine, based on the preference information and the environment information.

24. The method of claim 23, wherein the environment information includes at least one of the following: location information, time information, quality of service information, price information, and system availability information.

25. The method of claim 23, wherein the preference information includes at least one of the following: a pricing preference, a time preference, a quality of service preference, a language preference and a system availability preference.

26. The method of claim 23 further comprising:
receiving at least one recognized term from at least one of the following: the embedded speech recognition engine, the network speech recognition engine and the wireless local area network speech recognition engine;
providing the at least one recognized term to an output device; and
receiving a final confirmation of a correct recognized term of the at least one recognized term.

* * * * *